_Patented Mar. 19, 1946_  2,396,804

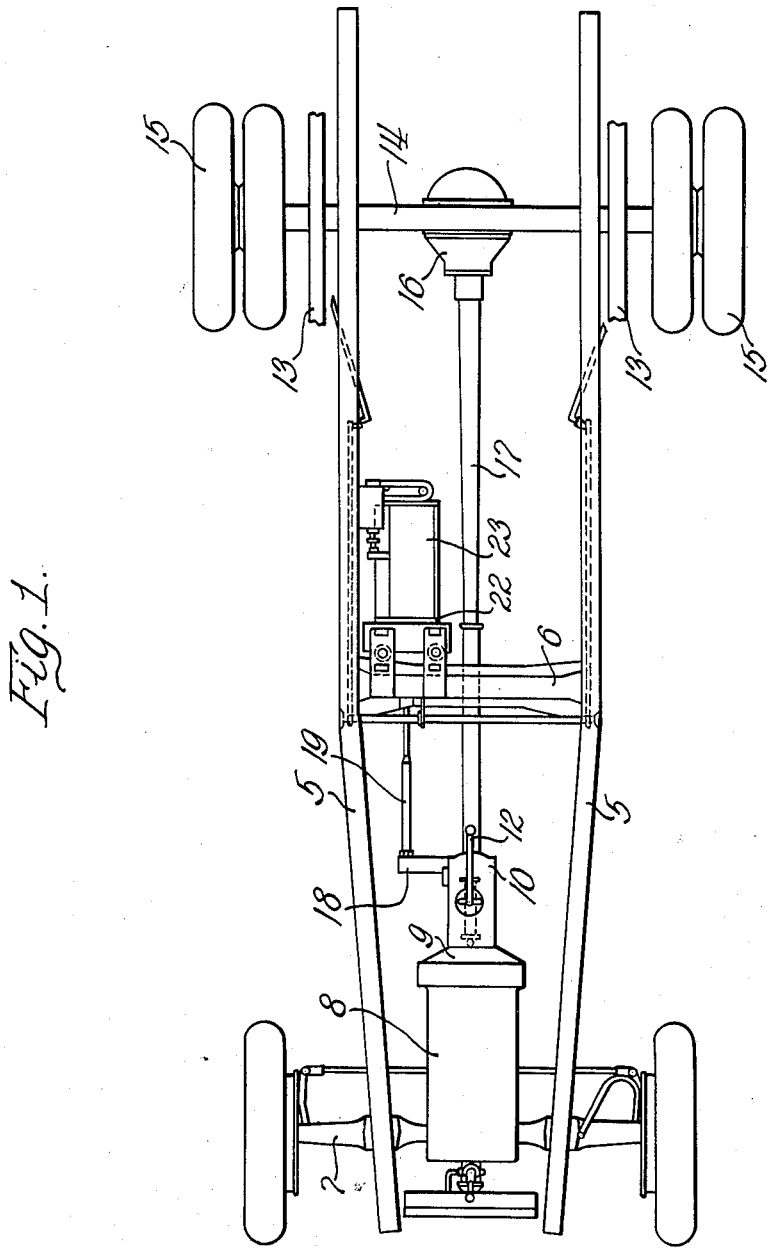

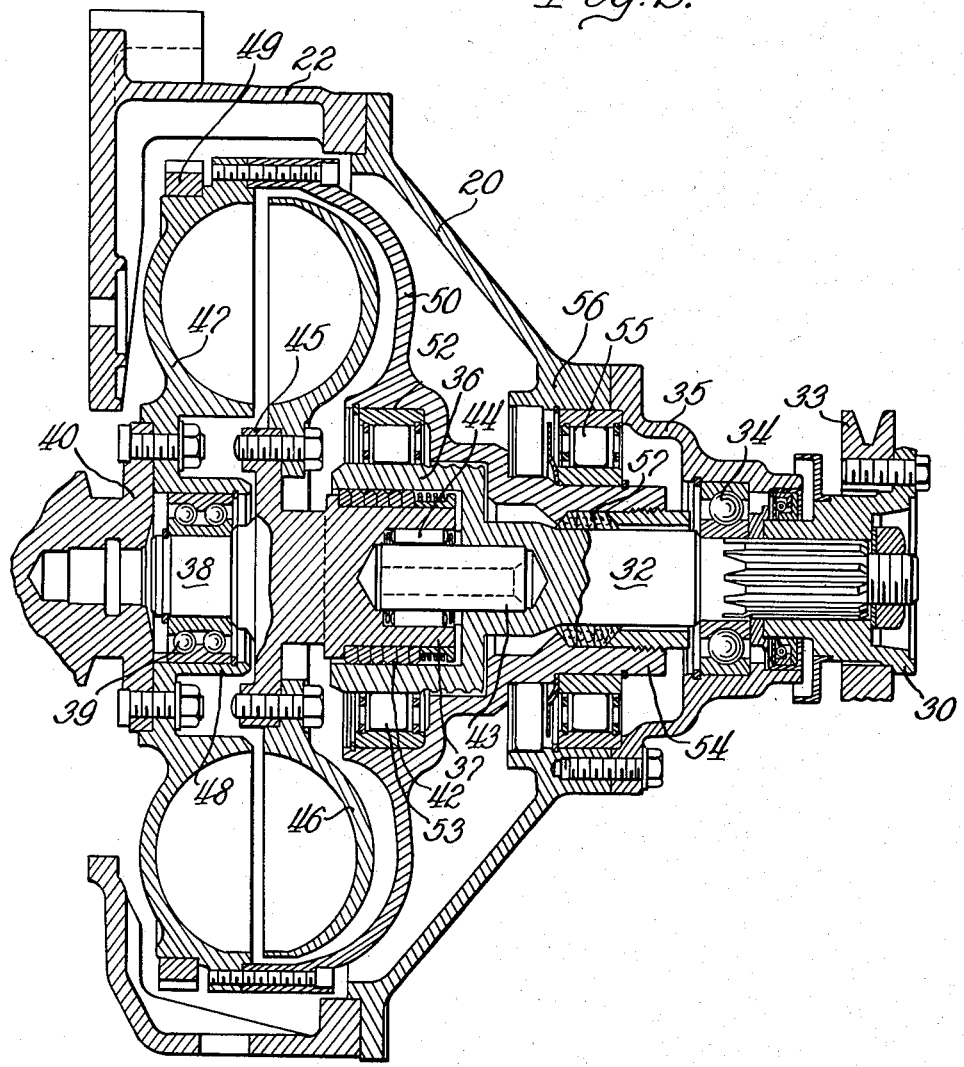

UNITED STATES PATENT OFFICE 2,396,804

VEHICLE

Donald D. Ormsby, Buchanan, Mich., assignor to Clark Equipment Company, Buchanan, Mich., a corporation Original application May 10, 1943, Serial No. 486,445. Divided and this application October 28, 1943, Serial No. 508,014

5 Claims. (Cl. 192—3.2)

This invention relates to vehicles and more particularly is concerned with a vehicle of the multiple engine type in which an auxiliary or supplemental engine is provided for adding its power to that of the main or conventional engine when the latter engine is under load.

The present invention is a continuation of and an improvement over the invention disclosed in my co-pending application, Serial No. 256,947, filed February 17, 1939, and is a division of my co-pending application, Serial No. 486,445, filed May 10, 1943.

In vehicles of this type, as disclosed in said co-pending applications, the auxiliary engine is arranged to have its power connected through a lay shaft into the countershaft of the transmission connected to the main engine. The auxiliary engine is normally inoperative, but under suitable conditions is started and brought up to speed whereupon, through suitable overrunning clutch mechanism or the like, it is clutched to the lay shaft so that the torque from this auxiliary engine can be transmitted to the countershaft of the transmission for assisting in driving the vehicle. The present invention is concerned particularly with improvement in the connection between the auxiliary engine and the lay shaft, and one of the primary objects is to provide in this driving connection an overrunning clutch and fluid coupling to provide drive means after the booster engine is started and brought up to speed so that the additional power of this engine will be fed in gradually to the drive train of the vehicle. This eliminates the possibility of gear clashing or sudden and unreasonable strains upon the parts of the driving train of the vehicle.

Another feature of the present invention produced by the construction disclosed herein is to prevent any possible lock-up of the gears against the compression of the engine if the vehicle tends to roll rearwardly at a stop, since the fluid coupling relieves this back pressure and thereby prevents such lock-up. This in turn facilitates shifting of the transmission gears when it is desired to again start the vehicle. Preferably, in a preferred form of the invention the fluid clutch is embodied in the flywheel housing of the auxiliary engine and has its driven element connected through an overrunning clutch to a stub shaft which in turn is connected to the lay shaft which connects through suitable gearing to the countershaft of the transmission.

Inasmuch as the lay shaft is rotating whenever the vehicle is in motion, inasmuch as it is geared directly into the countershaft of the transmission, it is obvious that there must be a speed differential between the engine shaft and the driven member of the fluid coupling at all times that the auxiliary engine is not in operation. This is accommodated by the overrunning clutch which remains inoperative whenever the lay shaft is rotating at a speed greater than the speed of rotation of the driven element of the fluid coupling. However, as the auxiliary engine comes up to speed the driving member of the fluid coupling imparts torque to the driven member and tends to bring this member up to speed. At such time as this driven member reaches a speed greater than that of the lay shaft, the overrunning clutch operates to lock the driven member to provide a positive drive from the fluid coupling into the lay shaft. When the auxiliary engine speed drops below that of the lay shaft the clutch disconnects the driving connection therebetween.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a plan view, partly diagrammatic, of the vehicle employing the present invention, and Figure 2 is a sectional view through the fluid coupling and overrunning construction which couples the auxiliary engine to the drive train.

Referring now in detail to the drawings, in Figure 1 there is shown a vehicle chassis including the side rails 5 and the cross member 6. Secured to the forward end of the side rails 5 in any conventional manner is the front axle assembly 7 and mounted between the rails in any conventional manner is the main engine 8 having the clutch housing 9 secured thereto, carrying the transmission 10 which has the gear shift lever 12 projecting therefrom. At the rear end of the side rails 5, mounted in any suitable manner as by springs 13, is a drive axle assembly 14 carrying the drive wheels 15. The drive axle assembly 14 includes a differential carrier 16, and extending from this carrier to the rear end of the transmission is the usual propeller shaft 17.

The transmission is provided with a laterally off-set housing 18, carrying gears connected to the countershaft of the transmission 10, and including a layshaft 19 extending into a clutch housing 20, secured to the flywheel housing 22 of the auxiliary engine 23. The engine 23 is supported in any suitable manner from the side rails of the cross member 6, and is preferably disposed in a position between the propeller shaft 17 and one of the side rails with the engine reversed relative to main engine 8.

Preferably the auxiliary engine 23 is a smaller horsepower than the main engine 8 and under conditions selected by the operator and dependent upon the load of main engine 8 can be started and brought up to speed, and add its power to the layshaft 19 and through the gears in housing 18 to the countershaft of the transmission, whereby its torque is added to that of the main engine for driving the propeller shaft 17. Such a construction is especially desirable in vehicles carrying heavy loads, such as trucks, buses or the like where, under normal operations in flat country, the power of the main engine 8 alone is sufficient to maintain the desired road speed, and the booster engine power is utilized only when it is desired to have additional torque for carrying the load over hills or the like, or for acceleration when pulling away from a stop in order to maintain, as far as possible, the maximum road speed.

For this reason, it is desirable in the interest of economy that the auxiliary engine be entirely stopped when its power is not required, but be instantly available whenever additional power is required.

Considering now in detail Figure 2 of the drawings, the lay shaft connection is preferable to a yoke 30, carried on the stub shaft 32 extending into the clutch housing 20 at the forward end of the booster engine. The clutch housing 20 in turn is piloted in and secured to the flywheel housing 22 of the booster engine. The shaft 32 is splined at its outer end to receive the hub 30, which also carries a pulley 33 for driving the water pump on the booster engine. This provides circulation of water to the booster engine at all times that the main engine is operating, since the shaft 32 is driven from the transmission 10 whether or not the booster engine is operating.

The shaft 32 adjacent at its outer end is carried in bearings 34 supported in the bearing cap 35 secured to the clutch housing 20. At its inner end, the shaft 32 is enlarged to provide a cylindrical hub portion 36, extending over the hub 37 of a shaft 38, piloted at its opposite end by means of the bearings 39 in the end 40 of the crank shaft of the booster engine. The hub portion 37 of the shaft 38 carries on its external surface a coiled spring 42 which operates as an overrunning clutch to couple the shaft 32 to the shaft 38 whenever the speed of the shaft 38 exceeds that of shaft 32. This spring clutch is of the type normally known as the L. G. S. clutch and the details of its operation are not believed necessary. Suffice it to say, that it operates as a one-way overrunning clutch to lock the shafts 38 and 32 for conjoint rotation when the speed of rotation of shaft 38 tends to exceed that of shaft 32.

The clutch disclosed comprises the relatively heavy coils of the spring 42 and a section of the spring is made of lighter coils and acts as an actuator. One end of the spring is secured against rotation on the hub 37 of the driven member of the fluid coupling, and the other end of the spring is so arranged as to have free sliding connection with the internal surface of hub 36 of shaft 32 tending to maintain the coil spring compressed about the hub 37 whenever the shaft 32 is rotating at a speed greater than that of hub 37. However, when hub 37 increases its speed of rotation beyond the speed of shaft 32 the connection is such that the spring expands, providing a frictional engagement between the external surface of hub 37 and internal surface of flange 36 forming a frictional drive whereby torque is transmitted from the driven element 36 of the coupling to the shaft 32. This connection is maintained at all times that the driven element is rotating faster than the shaft but is released whenever the shaft rotates faster than the driven member of the fluid coupling.

In order to provide proper alignment between the shafts 38 and 32 a suitable pin 43 is fitted in a counterbored end of the shaft 32 and piloted therein by means of the needle bearings 44 in a similar counterbored end of the shaft 38. Intermediate its ends it is provided with a radial flange portion 45, which has piloted thereon and bolted thereto the driven element 46 of a fluid clutch. The driving element of this clutch comprises the member 47 having a hub portion bolted to the crank shaft 40 of the booster engine and carrying a vertical flange 48 forming a seat for the bearings 49 in which the reduced end of shaft 38 is piloted. The driving element 47 of the fluid clutch carries at its outer periphery the starting gear 49 and also has bolted thereto the housing element 50 which encloses the driven element 46. The housing 50 has a bearing seat portion 52 receiving the roller bearing assembly 53 which rotatably supports the hub portion of the shaft 32. The housing 50 is provided with a hub extension 54 journalled by means of the roller bearings 55 in the end 56 of the clutch housing 20. A suitable lubricant seal 57 is provided between the shank portion of shaft 32 and the hub 54 to prevent the fluid in the coupling 46, 47 from escaping outwardly along shaft 32.

In the operation of the construction thus far described, the shaft 32 normally rotates in accordance with the particular speed ratio selected in the transmission 10, and when the booster engine is not operating, none of the other parts of the assembly thus far described rotates. However, as the booster engine starts and comes up to speed, the crank shaft 40 drives the impeller 47 which, through the fluid connection to member 46, initiates rotation of the member 46 and corresponding rotation of shaft 38. As the shaft 38 begins to rotate at a speed exceeding that of shaft 32 the clutch 42 is engaged to couple these shafts together in driving relation whereupon the torque of auxiliary engine 23 is transmitted to the shaft 32 and, consequently, into the crank shaft of the transmission to add this torque to that of the main engine for driving the propeller shaft of the vehicle.

By the use of the fluid coupling, it will be apparent that when the vehicle is stopped, if there is any tendency toward reverse rotation, the fluid coupling prevents the compression in the auxiliary engine from locking up the transmission gears, so that the operator will not have to overcome this pressure in shifting gears to again resume forward drive. Furthermore, the fluid coupling is of distinct advantage in preventing any shock loads being transmitted to the shaft 32 and thus will cause the torque of the booster engine to be smoothly applied to the shaft 32 as the clutch 42 engages the hub 36.

It is therefore apparent that I have provided, by use of the fluid coupling and overrunning clutch construction herein disclosed, a means for producing a smooth and effective coupling of the auxiliary engine into the drive train whenever the auxiliary engine comes up to a speed greater than that of the lay shaft which is sufficiently smooth due to the action of the coupling and clutch to prevent any clashing of gears or unnecessary strain upon the parts and which is effectively disconnected when the power of the auxiliary engine is not required. In addition, due to the use of a fluid coupling it is obvious that there can be no positive lock-up which would prevent shifting of the transmission gears when the second engine is inoperative.

I am aware that various changes may be made in details of the present construction, and therefore do not intend to be limited except as defined by the scope and spirit of the appended claims.

I claim:

1. In a coupling for connecting an engine to a lay shaft, a fluid driving element, a fluid driven element having an enlarged annular hub portion, a shaft having an enlarged hub overlying said hub portion and radially spaced thereabout, a helical spiral spring interposed therebetween and acting as a one-way clutch, and means on the outer annular surface of said shaft hub forming a bearing support for said driving element.

2. The coupling of claim 1 further characterized in the provision of a hub on said driving element, and a projecting spindle on said driven element journalled in said hub.

3. Coupling means for connecting an engine to a shaft comprising a clutch housing receiving one end of said shaft, said shaft end having an enlarged annular hub, a fluid coupling including a driving element having an extended portion overlying said shaft hub and journalled in said housing, bearing means between said hub and extended portion, a driven element within said driving element having an annular hub portion extending into said shaft hub, helical spring means between said hub and hub portion acting as a one-way clutch therebetween, said shaft and hub portion having adjacent alined axial bores, and alinement means in said bores extending between said members.

4. A fluid coupling for connecting a power shaft and a driven shaft comprising a driving element connected to said power shaft and having an enclosing housing portion, a driven element enclosed thereby having a hub portion, one end of said hub portion being journalled in said driving element, the other end of said hub portion having an annular cylindrical surface and an axial counterbore, said driven shaft extending into said housing portion and having an enlarged cylindrical flange portion overlying said cylindrical surface, an axial counterbore in said driven shaft alined with said first counterbore, a helical spring between said surface and said flange portion providing a one-way clutch therebetween, and alinement pin means extending between said counterbores.

5. The coupling of claim 4 including anti-friction bearing means between said housing portion and said flange portion of said driven shaft.

DONALD D. ORMSBY.